(12) United States Patent
Shi et al.

(10) Patent No.: US 12,211,508 B2
(45) Date of Patent: Jan. 28, 2025

(54) SERVER-SIDE PROCESSING METHOD AND SERVER FOR ACTIVELY INITIATING DIALOGUE, AND VOICE INTERACTION SYSTEM CAPABLE OF INITIATING DIALOGUE

(71) Applicant: AI SPEECH CO., LTD., Suzhou (CN)

(72) Inventors: Weisi Shi, Suzhou (CN); Hongbo Song, Suzhou (CN); Chengya Zhu, Suzhou (CN); Shuai Fan, Suzhou (CN)

(73) Assignee: AI SPEECH CO., LTD., Suzhou (CN)

( * ) Notice: Subject to any disclaimer, the term of this patent is extended or adjusted under 35 U.S.C. 154(b) by 317 days.

(21) Appl. No.: 17/788,591

(22) PCT Filed: Nov. 20, 2020

(86) PCT No.: PCT/CN2020/130325
§ 371 (c)(1),
(2) Date: Jun. 23, 2022

(87) PCT Pub. No.: WO2021/129262
PCT Pub. Date: Jul. 1, 2021

(65) Prior Publication Data
US 2023/0037913 A1 Feb. 9, 2023

(30) Foreign Application Priority Data
Dec. 26, 2019 (CN) .......................... 201911364247.0

(51) Int. Cl.
*G10L 15/22* (2006.01)
*G10L 15/30* (2013.01)
*H04L 67/141* (2022.01)

(52) U.S. Cl.
CPC .............. *G10L 15/30* (2013.01); *G10L 15/22* (2013.01); *H04L 67/141* (2013.01)

(58) Field of Classification Search
CPC .......... G06F 3/167; G06F 40/30; G06F 40/35; G06F 40/40; G06F 40/253; G10L 15/22;
(Continued)

(56) References Cited

U.S. PATENT DOCUMENTS 6,496,799 B1 12/2002 Pickering
10,331,791 B2 * 6/2019 Anbazhagan ........... G06F 40/35
(Continued)

FOREIGN PATENT DOCUMENTS

CN 105975511 A 9/2016
CN 106020488 A 10/2016
(Continued)

OTHER PUBLICATIONS

Foreign Communication from Related Application—First Chinese Office Action with English Translation, CN Patent Application No. 201911364247.0 filed Dec. 26, 2019, 17 pages.
(Continued)

*Primary Examiner* — Jakieda R Jackson
(74) *Attorney, Agent, or Firm* — Conley Rose, P.C.; Rodney B. Carroll (57) ABSTRACT

A server-side processing method for implementing an active initiation of a dialogue is disclosed, comprising: establishing a communication connection with a voice client, in response to a received request for establishing a connection from the voice client; receiving an information stream sent by the voice client through the communication connection; performing a dialogue decision-making process according to the information stream, obtaining and outputting an adapted dialogue content to the voice client upon determining that it is an active dialogue scenario. A server and a system for implementing an active initiation of a dialogue are also provided. The disclosed solutions realize intelligent decision-making for voice interaction, and can actively initiate a
(Continued)

dialogue based on server-side decision-making, improving interaction experience and realizing intelligent interaction.

8 Claims, 6 Drawing Sheets

(58) Field of Classification Search
CPC .. G10L 15/18; G10L 2015/223; G10L 15/063
See application file for complete search history.

(56) References Cited

U.S. PATENT DOCUMENTS

| | | | |
|---|---|---|---|
| 10,891,152 B2* | 1/2021 | Anbazhagan | G06F 9/4843 |
| 11,423,911 B1* | 8/2022 | Fu | G10L 15/26 |
| 2004/0230434 A1* | 11/2004 | Galanes | H04M 3/4938 |
| | | | 704/270.1 |
| 2005/0080629 A1* | 4/2005 | Attwater | G10L 15/22 |
| | | | 704/E15.04 |
| 2005/0091059 A1* | 4/2005 | Lecoeuche | H04M 1/72445 |
| | | | 704/270.1 |
| 2005/0154591 A1* | 7/2005 | Lecoeuche | G10L 15/30 |
| | | | 704/E15.047 |
| 2015/0339745 A1* | 11/2015 | Peter | G06Q 30/0613 |
| | | | 705/26.42 |
| 2017/0110129 A1* | 4/2017 | Gelfenbeyn | G06F 16/3329 |
| 2017/0125008 A1* | 5/2017 | Maisonnier | G10L 15/22 |
| 2017/0263269 A1* | 9/2017 | Kuo | G10L 15/142 |
| 2018/0232436 A1 | 8/2018 | Elson et al. | |
| 2018/0260856 A1* | 9/2018 | Balasubramanian | |
| | | | G06F 40/211 |
| 2019/0115016 A1* | 4/2019 | Seok | G10L 15/22 |
| 2019/0139547 A1* | 5/2019 | Wu | G06F 3/167 |
| 2019/0251965 A1* | 8/2019 | Dharne | G06V 40/174 |
| 2019/0347067 A1* | 11/2019 | Jolfaei | G06F 3/167 |

FOREIGN PATENT DOCUMENTS

| | | |
|---|---|---|
| CN | 107004410 A | 8/2017 |
| CN | 108446286 A | 8/2018 |
| CN | 109036388 A | 12/2018 |
| CN | 109543010 A | 3/2019 |
| CN | 109658928 A | 4/2019 |
| CN | 110209792 A | 9/2019 |
| CN | 110211573 A | 9/2019 |
| CN | 110265009 A | 9/2019 |
| CN | 110442701 A | 11/2019 |
| CN | 111107156 A | 5/2020 |
| JP | 2016206469 A | 12/2016 |
| JP | 2017067849 A | 4/2017 |
| KR | 102047385 B1 | 11/2019 |
| WO | 2018/151766 A1 | 8/2018 |
| WO | 2021129262 A1 | 7/2021 |

OTHER PUBLICATIONS

Foreign Communication from Related Application—Second Chinese Office Action with English Translation, CN Patent Application No. 201911364247.0 filed Dec. 26, 2019, 19 pages.
Foreign Communication from Related Application—International Search Report and Written Opinion of the International Searching Authority, International Patent Application No. PCT/CN2020/130325 dated Feb. 18, 2021, with English translation of Search Report, 9 pages.
Foreign Communication from Related Application—Communication Pursuant to Article 94(3) EPC, issued Apr. 29, 2024, EP Patent Application No. 20907823.7 filed Nov. 20, 2020, 5 pages.
Foreign Communication from Related Application—Supplementary European Search Report, issued May 19, 2023, EP Patent Application No. 20907823.7 filed Nov. 20, 2020, 8 pages.
Foreign Communication from Related Application—Notice of Reasons for Refusal with English Translation, issued May 9, 2023, JP Patent Application No. 2022538904 filed Nov. 20, 2020, 6 pages.

* cited by examiner

SERVER-SIDE PROCESSING METHOD AND SERVER FOR ACTIVELY INITIATING DIALOGUE, AND VOICE INTERACTION SYSTEM CAPABLE OF INITIATING DIALOGUE

This application is a filing under 35 U.S.C. 371 of International Application No. PCT/CN2020/130325, filed Nov. 20, 2020, which claims the benefit of Chinese Non-Provisional Patent Application No. 201911364247.0, filed on Dec. 26, 2019, the entirety of the contents of both applications being incorporated herein by reference.

TECHNICAL FIELD

The invention relates to the technical field of voice interaction, in particular to a server-side processing method and server for actively initiating a dialogue, and a voice interaction system capable of actively initiating a dialogue.

BACKGROUND

In recent years, with the development of intelligent voice technology, various intelligent devices based on voice interaction are increasingly widely used. However, current voice interaction process is mostly initiated by user, and the device responds passively based on the user's active voice command. In fact, in many scenarios, it is required to initiate a dialogue actively by the device, which conforms to an actual scenario of human-to-human interaction and makes voice interaction process more natural. This is also the key to making voice interaction devices truly show high intelligence. In order to achieve this goal, the following two options are usually adopted to realize the voice interaction process for actively initiating a dialogue:

Option 1: when the cloud responds to the last request, it returns a dialogue script to be actively initiated to the client side together, and the client side determines an appropriate time to play the active dialogue script; and Option 2: determination is made at the client side, so that when an active dialogue is required, a request is sent to the cloud, and the cloud returns an active dialogue script.

However, both of the above options separate the client from the server-side, and the server-side, as a passive party, is limited in interacting. For example, the above two schemes have the following defects.

Option 1 is of low timeliness. Two dialogue scripts are obtained for each request. When the client is playing the second script, it is likely that the user's scenario has changed. At this time, playing the second script that has been saved becomes inappropriate and makes the user consider the device unintelligent.

The active dialogue scenario of option 2 is limited. Since the client does not have semantic and dialogue information, conditional determination at the client side is very limited.

SUMMARY OF THE INVENTION

In order to solve the above-mentioned problems, the inventor has come up with an implementation scheme of making dialogue decisions by virtue of advantages of the server-side, so as to actively initiate a dialogue based on dialogue decision-making situation in the server-side.

According to a first aspect of the present invention, a server-side processing method for actively initiating a dialogue is provided, comprising the following steps:

establishing a communication connection with a voice client, in response to a received request for establishing a connection from the voice client;

receiving an information stream sent by the voice client through the communication connection;

performing a dialogue decision-making process according to the information stream, obtaining and outputting an adapted dialogue content to the voice client upon determining that it is an active dialogue scenario.

According to a second aspect of the present invention, a server for implementing active initiation of a dialogue is provided, which is configured with a communication module for establishing a communication connection with a voice client, in response to a received request for establishing a connection from the voice client;

an information receiving module for receiving an information stream sent by the voice client through the communication connection; and a dialogue decision-making module for performing a dialogue decision-making process according to the information stream, obtaining and outputting an adapted dialogue content to the voice client when an active dialogue scenario is determined.

According to a third aspect of the present invention, a voice interaction system capable of actively initiating a dialogue is provided, which includes a voice client and a voice server-side, wherein, the voice client is configured to initiate a connection request with the voice server-side, output collected audio information to the voice server-side in real time through the established communication connection after the communication connection is established, and play dialogue content sent by the voice server-side upon receiving the same; and the voice server-side is the above-mentioned server for implementing the active initiation of the dialogue.

According to a fourth aspect of the present invention, an electronic device is provided, including at least one processor and a memory communicatively connected to the at least one processor, wherein the memory stores instructions executable by the at least one processor, which are executed by the at least one processor to enable the at least one processor to perform steps of the above-mentioned method.

According to a fifth aspect of the present invention, a storage medium is provided, which stores a computer program, wherein the program implements steps of the above-mentioned method when executed by a processor.

The solutions of the embodiment of the present invention can initiate an active voice dialogue based on dialogue decision-making of the server-side. Since the server-side has complete dialogue information and semantic determination ability, the server is enabled to obtain the status of the voice client in real time by extending the functions of the server-side, make dialogue decisions based on the real-time status of the voice client, and can also make more intelligent decisions in combination with implicit information from other modules in the voice interaction. Moreover, in the embodiment of the present invention, the voice client only needs to establish and maintain a communication connection with the server-side and send the information stream based on the communication connection, without needing to do complex logic processing, which ensures the timeliness of client information while reducing the burden on the client. In addition, the server-side obtains a stable information stream by establishing a specific communication connection with the voice client, which ensures an orderly update of the status of the voice client.

DETAILED DESCRIPTION

In order to make the purposes, technical solutions and advantages of embodiments of the present invention more clear, the technical solutions of the embodiments of the present invention will be clearly and completely described below with reference to the drawings of the embodiments of the present invention. Obviously, the described are merely some but not all of the embodiments of the present invention. Based on the embodiments of the present invention, all other embodiments obtained by ordinary skilled in the art without inventive efforts shall fall within the scope of the present invention.

It should be noted that the embodiments in the present application and the features in these embodiments can be combined with each other without conflict.

The present invention can be described in the general context of computer-executable instructions such as program modules executed by a computer. Generally, program modules include routines, programs, objects, elements, and data structures, etc. that perform specific tasks or implement specific abstract data types. The present invention can also be practiced in distributed computing environments in which tasks are performed by remote processing devices connected through a communication network. In a distributed computing environment, program modules may be located in local and remote computer storage media including storage devices.

In the present invention, "module", "means", "system", etc. refer to related entities applied to a computer, such as hardware, a combination of hardware and software, software or software in execution, etc. In detail, for example, an element may be, but is not limited to, a process running on a processor, a processor, an object, an executable element, an execution thread, a program, and/or a computer. Also, an application program or a script program running on the server or the server may be an element. One or more elements can be in the process and/or thread in execution, and the elements can be localized in one computer and/or distributed between two or more computers and can be executed by various computer-readable media. Elements can also be based on signals with one or more data packets, for example, a signal from data that interacts with another element in a local system, a distributed system, and/or interacts with other systems through signals on a network on the internet communicates through local and/or remote processes.

Finally, it should be noted that in this specification, terms such as first and second are used only to distinguish one entity or operation from another entity or operation, and do not necessarily require or imply there is any such actual relationship or order among these entities or operations. Moreover, terms such as "including" and "comprising" shall mean that not only those elements described, but also other elements not explicitly listed, or elements inherent to the described processes, methods, objects, or devices, are included. In the absence of specific restrictions, elements defined by the phrase "comprising . . . " do not mean excluding other identical elements from process, method, article or device involving these mentioned elements.

The implementation solution for actively initiating a dialogue according to the embodiment of the present invention can be applied to any smart devices, such as a mobile phone, a watch, a headset, a personal PC computer, or the like, which have intelligent voice interaction function for implementing the active initiation of a dialogue with a user according to the situation during the voice interaction process. However, the scope of application of the present invention is not so limited. The solution provided by the embodiments of the present invention can combine respective advantages of the voice client and the server-side, and utilize the information stream acquired and uploaded by the voice client in real time, and the server-side can make intelligent dialogue decisions based on its own overall determination on semantics and dialogue information, and actively initiate a dialogue according to the scenario, thereby improving the user's interaction experience and making the voice interaction device more intelligent.

The present invention will be described in further detail below in conjunction with the drawings.

Figure 1:
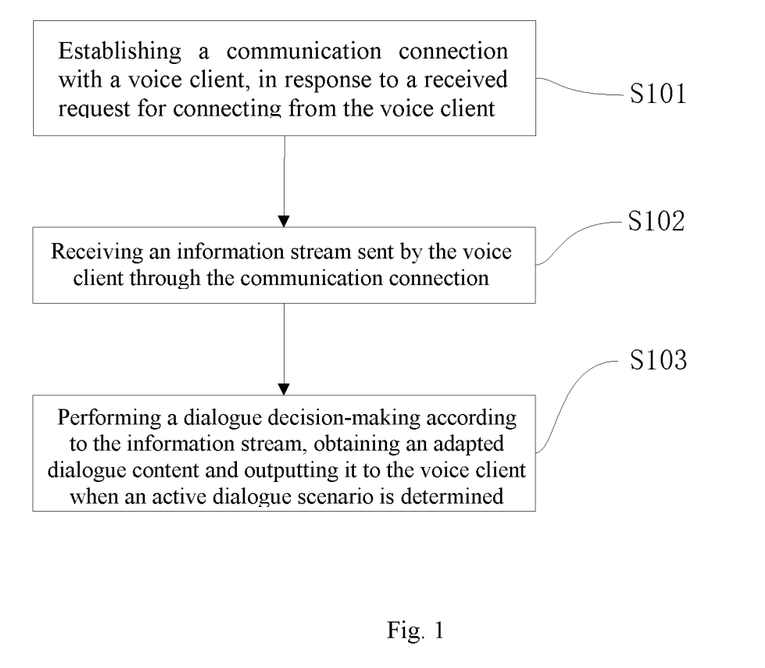
FIG. 1 is a flowchart of a method for implementing a server-side processing method for actively initiating a dialogue according to an embodiment of the present invention.

FIG. 1 schematically shows a server-side processing method for actively initiating a dialogue according to an embodiment of the present invention. The execution body of the method in the embodiment of the present invention may be any service terminal that provides voice recognition processing, semantic parsing processing and dialogue management functions for the voice interaction function, such as a cloud-side server deployed with voice recognition processing, semantic parsing processing and dialogue management function modules, or a second service terminal capable of bidirectional communication with the service terminal deployed with voice recognition processing, semantic parsing processing and dialogue management function modules, such as a second cloud-side server that communicates bidirectionally with the cloud-side server deployed with voice recognition processing, semantic parsing processing, and dialogue management function modules, and can of course also be the server shown in FIG. 3 for actively initiating a dialogue.

The voice client involved in the embodiment of the present invention may be any smart device with a voice interaction function, such as a mobile phone, a watch, a headset, a personal PC computer, a vehicle terminal, and the like. Taking the execution subject as an example of the server shown in FIG. 3 for implementing the active initiation of a dialogue, as shown in FIG. 1, the method includes the following steps.

Step S101: establishing a communication connection with a voice client, in response to a received request for establishing a connection from the voice client. In this embodiment, in order to ensure the timeliness of the voice client status obtained by the server-side, a communication connection is established with the corresponding voice client, and the status update of the voice client is acquired in real time based on the communication connection. That is, a connection channel is established between the voice client and the server-side, which is dedicated to obtaining the real-time status of the voice client, according to the connection request of the voice client. In an implementation, the solution of the embodiment of the present invention is configured such that the voice client actively initiates a connection request, and the server-side is configured to establish a communication connection with the voice client after receiving the connection request from the voice client. In this way, not only can each voice client be clearly identified according to requests of voice clients, but also the voice client can actively decide whether to extend the service of actively initiating a dialogue interaction according to the embodiment of the present invention.

Preferably, the communication connection in the embodiment of the present invention is a long connection of duplex communication. By establishing the long connection of duplex communication, not only the stability of transmission information can be ensured, but also the voice client and the server-side are completely equal in requesting dialogue to each other after the communication connection is established. In this way, the server-side can actively push messages to the voice client at any time as required, without waiting for the voice client's request, so that the server-side can reliably initiate a dialogue actively. Exemplarily, the WebSocket protocol or the TCP Socket custom protocol can be used to establish the long connection of duplex communication.

Step S102: receiving an information stream sent by the voice client through the communication connection. After the communication connection is established between the server-side and the voice client, the status information of the voice client will be obtained through the communication connection. Specifically, the voice client sends the collected information in real time through the communication connection in the form of an information stream. The information contained in the information stream may be the audio stream recorded by the voice client through its sound pickup device, such as a radio, or the device information collected in real time by the voice client, such as geographic location, contact hot words, etc., and may also include both the audio stream and device information. Preferably, the audio stream is transmitted at a fixed frequency to ensure the orderliness and timeliness of information transmission.

Step S103: performing a dialogue decision-making process according to the information stream, and when it is determined to be an active dialogue scenario, obtaining an adapted dialogue content and outputting it to the voice client. The dialogue decision-making process refers to a process used to determine whether a dialogue needs to be initiated actively, and is implemented based on the information stream decision-making framework. The information stream decision-making framework can be embodied as pre-configured and stored trigger conditions of active dialogue scenarios and dialogue content associated with the trigger conditions.

Figure 7:
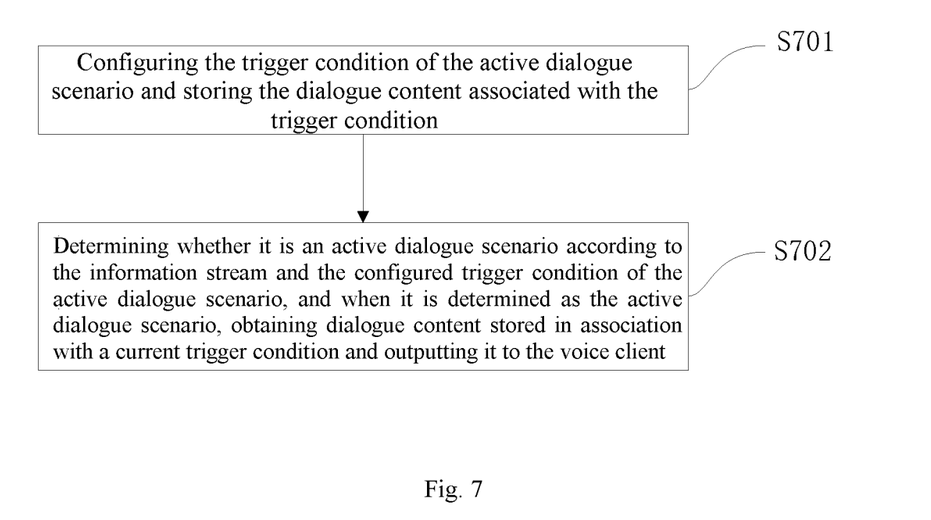
FIG. 7 is a flowchart of a method for performing the dialog decision-making process on the server-side according to an embodiment of the present invention.

The active dialogue scenario in the embodiments of the present invention refers to a scenario in which the server-side is required to initiate a dialogue actively. The trigger conditions refer to preset conditions that cause the active dialogue scenario to occur. The dialogue content associated with the trigger conditions refers to the dialogue content that is required to be actively played on the voice client when the active dialogue scenario occurs. As shown in FIG. 7, the trigger conditions of the active dialogue scenario and the dialogue content associated with the trigger conditions can be generated and stored by receiving configuration information input externally, so as to realize configuring the trigger conditions of the active dialogue scenario and storing the dialogue content associated with the trigger conditions in step S701. In this way, after the information stream is received, as shown in FIG. 7, in step S702, it can be determined whether it is an active dialogue scenario according to the acquired information stream and the pre-configured trigger conditions of the active dialogue scenario, so as to determine whether it is necessary to actively initiate a dialogue according to the determination result.

The embodiment of the present invention is configured to determine that it is an active dialogue scenario when the trigger conditions are satisfied, and when the active dialogue scenario is determined, the dialogue content stored in association with the current trigger condition is acquired and output to the voice client, and the dialogue content is played on the voice client, thereby realizing a dialogue interaction actively initiated at the server side.

Among them, the active dialogue scenario, its trigger condition, and the dialogue content associated with the trigger condition can be defined and configured according to the actual needs of the user.

The method of the embodiment of the present invention will be described in more detail below by taking the active dialogue scenario as examples of waiting for inquiry, breaking silence and active interruption.

As a preferred implementation example, in the example of the present invention, the information stream transmitted from the voice client to the server-side includes the audio information picked up by the voice client (that is, the recorded audio stream), and the active dialogue scenario trigger conditions configured on the server-side include at least the following two situations:

The first trigger condition is that recognition content is contained and the recognition content is invalid as to semantics.

The second trigger condition is that recognition content is not contained and a corresponding context status exists.

The triggering conditions of each active dialogue scenario do not interfere with each other, but the triggering conditions of the same active dialogue scenario need to be fully satisfied. That is, no matter which trigger condition of the active dialogue scenario is satisfied, as long as the trigger condition is fully satisfied, the server-side can be enabled to initiate a round of active dialogue. In the above example, the recognition content refers to the content of the recognition result of the audio information transmitted from the voice client by the server-side. That is, whether the recognition result contains the recognition content and whether the semantics of the recognition content in the recognition result is valid. The context status refers to the interaction flow determined by the server-side in the dialogue management, which can be used to indicate the user's intention or the current context. Exemplarily, according to the interaction flow of dialogue management, a corresponding context status can be configured to include waiting for inquiry and breaking silence.

Figure 2:
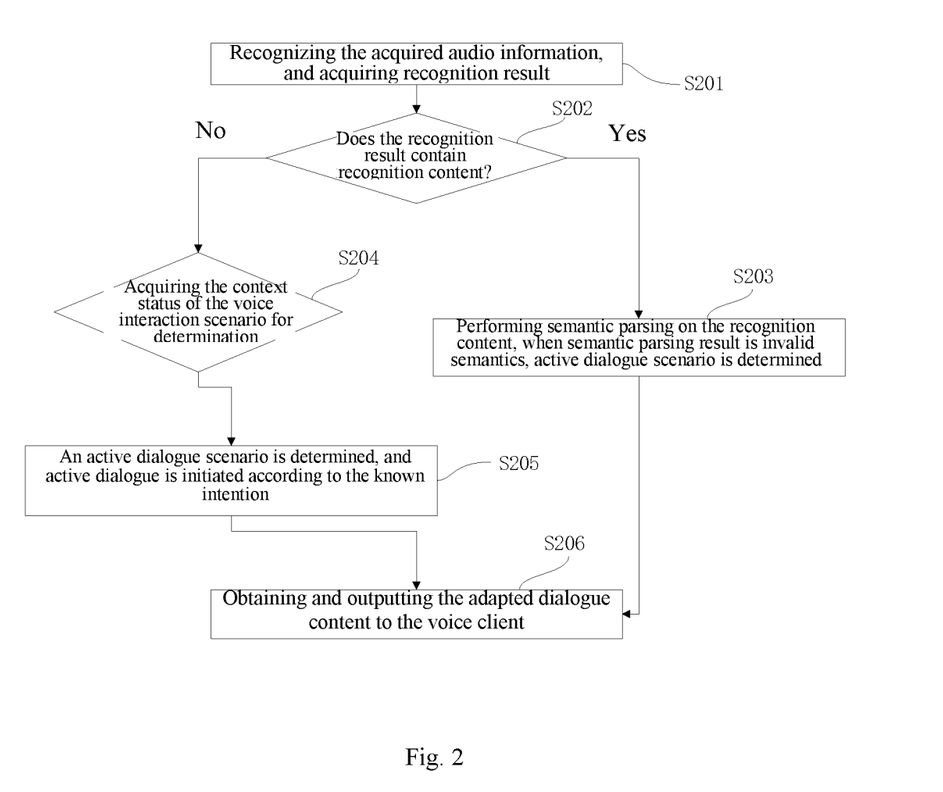
FIG. 2 is a flowchart of a method for initiating an active dialogue by performing a dialogue decision-making process on the server-side according to an embodiment of the present invention.

Taking the above active dialogue scenario configuration conditions as an example, the specific decision-making process of this step will be described in detail below with reference to the decision-making process flowchart shown in FIG. 2. As shown in FIG. 2, the implementation process according to an embodiment of the present invention for performing a dialogue decision-making process and initiating the voice interaction of the active dialogue when an active dialogue scenario is determined includes the following steps.

Step S201: recognizing the acquired audio information to acquire a recognition result. Recognizing audio information on the server-side to acquire the recognition result can be realized by using the existing voice recognition functions and modules of the server-side for voice interaction, such as the voice recognition module configured on the original cloud-side server that provides voice interaction service, which will not be repeated herein.

Step S202: determining whether the recognition result contains recognition content. When the recognition content is contained, step S203 will be performed, and when the recognition content is not contained, step S204 will be performed. After the voice recognition is performed, it is determined whether the recognition result contains content. Since the audio information is converted into text information during voice recognition, determining whether the recognition result contains the recognition content can be implemented as determining whether the converted text information contains a text string.

Step S203: performing semantic parsing on the recognition content, and when the semantic parsing result is invalid semantics, it is determined that an active dialogue scenario occurs. The semantic parsing of the recognition content can be realized by using the existing semantic parsing functions and modules of the semantic interaction server. The voice recognition and semantic parsing are conventional technologies in the existing voice interaction system, and this function can be directly used. For example, it can be realized by a voice parsing module configured on the existing cloud-side server that provides the voice interaction service, so the specific recognition and parsing process will not be described in detail here. The valid semantics refers to the semantics corresponding to a specific execution or response action existing in the semantic parsing engine. If no matching item is found in the semantic parsing engine, it is regarded as invalid semantics. In a specific process of voice interaction, when a user speaks continuously, the recognition content is getting longer and longer while the content is meaningless or not valid(that is, not correspond to a matching execution or response action), performing an active interruption is more in line with intelligent interaction. Therefore, the situation corresponding to this scenario can be used as an active dialogue scenario that is to be actively interrupted, which can realize more intelligent interaction and improve user interaction experience. Exemplarily, for this trigger condition, the configured dialog content may be an interrupt instruction or a reminder instruction, such as "speak please . . . ", so as to guide the user to perform effective interaction.

Step S204: acquiring the context status of the voice interaction scenario for making a determination, and when the acquired context status of the voice interaction scenario corresponds to that in the trigger condition, Step S205 will be performed. When an audio that does not contain recognition content is obtained, it may also be a situation where an active dialogue needs to be initiated, such as the following two situations.

Scenario of waiting for inquiry: the user expressed an intention to wait in the last round of interaction, and the machine needs to actively initiate an inquiry after waiting for a specified time.

Scenario of breaking silence: an embarrassing situation where neither side speaks may occasionally occur during a dialogue process. At this time, the machine needs to take the initiative to ask questions and guide the user.

Under the circumstances, it is necessary for the machine to be able to determine the situation of the dialogue according to the context status, so as to initiate a dialogue intelligently. Therefore, the above context status can be stored as a trigger condition for initiating a dialogue when there is no recognition content. Since this process is done on the server-side which records the context status of the entire voice interaction process, that is, the interaction process, the interaction process can be obtained for making a determination, and it can be determined whether it is in line with the context status of an active dialogue scenario according to the interaction flow. For example, if it is determined that the interaction process has an execution flow of waiting for inquiry, or it is determined that a voice interaction process is in progress and the user is suddenly silent, it is determined as an active dialogue scenario, and step S205 will be performed.

Step S205: an active dialogue is initiated according to the known intention upon determination of an active dialogue scenario. Since the server-side knows the context status, that is, the interaction process, it can determine the known intention according to the interaction process, and then initiate an active dialogue based on the known intention, including determining the action to be performed or the content to be played based on the known intention. Since the known intention generally appears in the process of multiple rounds of interaction, determining the known intention may be based on the results of multiple rounds of interaction. For example, in a scenario of car navigation, the destination and navigation route have been determined in the previous rounds of dialogue. At this time, the known intention can be determined as the known navigation intention, and the active dialogue content can be determined as the recommending parking lot around the destination according to the known navigation intention, etc. Exemplarily, according to the known intention, the dialogue content corresponding to waiting for inquiry may be inquiry for a specified item or content, and the dialogue content for breaking silence may be questioned according to its previous interaction flow status.

Step S206: obtaining and outputting an adapted dialogue content to the voice client.

Step S207: the voice client plays the dialogue content.

Based on the above method and process, it can be realized that based on the audio stream transmitted by the client in real time, the server-side can determine the active dialogue scenario according to the interaction scenario, so as to initiate a dialogue at an appropriate time, and the voice client can play the dialogue content. This solution not only enables the client to transmit its status information in real time, but also has the server-side to make decisions in combination with other information (such as context status) in voice interaction, thereby ensuring both timeliness and machine intelligence, and greatly improving user's interaction experience.

In the implementation example in which the information stream transmitted by the voice client also includes device information, the server-side can also make active dialogue decisions according to the real-time device information. For example, when the server-side performs dialogue decision-making process, it can determine the recommended content according to the device information, and output the recommended content as the dialogue content to the voice client.

For example, the server-side can also actively initiate a dialogue interaction to the voice client to recommend surrounding stores and food according to the real-time geographic location information, etc.

Figure 3:
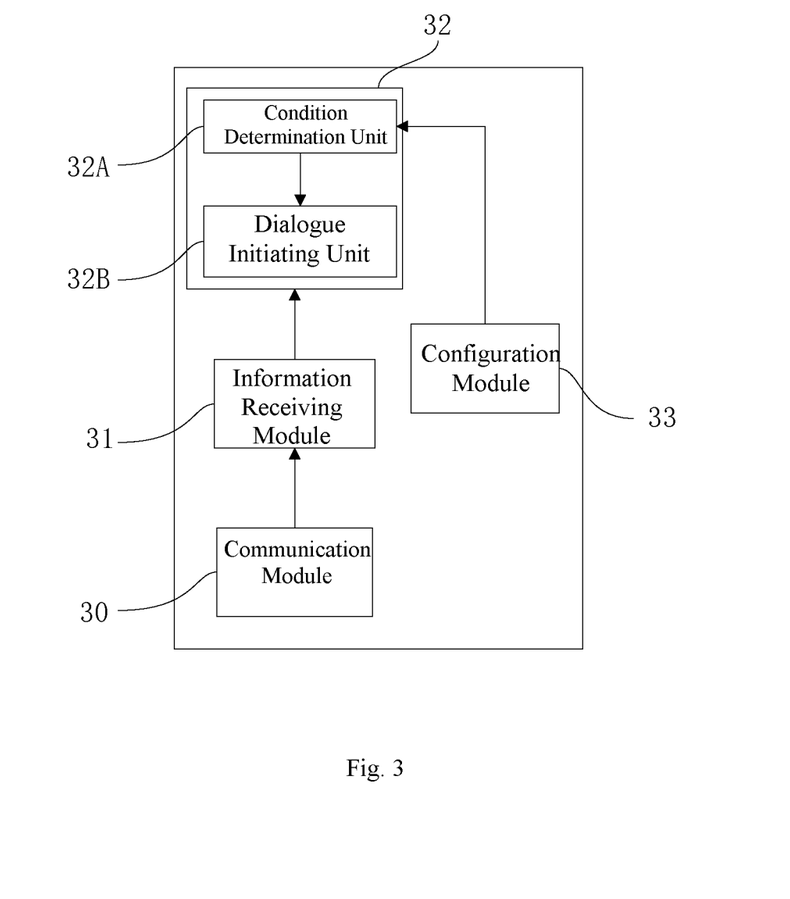
FIG. 3 is a schematic diagram of the architecture of a server for implementing the active initiation of a dialogue according to an embodiment of the present invention.

FIG. 3 schematically shows a server for implementing the active initiation of a dialogue according to an embodiment of the present invention. As shown in FIG. 3, the server is configured with:

a communication module 30 for establishing a communication connection with a voice client, in response to a received request for establishing a connection from the voice client;

an information receiving module 31 for receiving an information stream sent by the voice client through the communication connection;

a dialogue decision-making module 32 for performing a dialogue decision-making process according to the information stream, and obtaining an adapted dialogue content and outputting it to the voice client when an active dialogue scenario is determined; and a configuration module 33 for configuring trigger conditions of active dialogue scenarios and storing dialogue content associated with the trigger conditions.

The dialogue decision-making module 32 is implemented to include:

a condition determination unit 32A for determining whether it is an active dialogue scenario according to the information stream and the trigger conditions of the configured active dialogue scenario, and calling a dialogue initiation unit when an active dialogue scenario is determined; and a dialogue initiating unit 32B for acquiring and outputting the dialogue content stored in association with the current trigger condition to the voice client.

Figure 4:
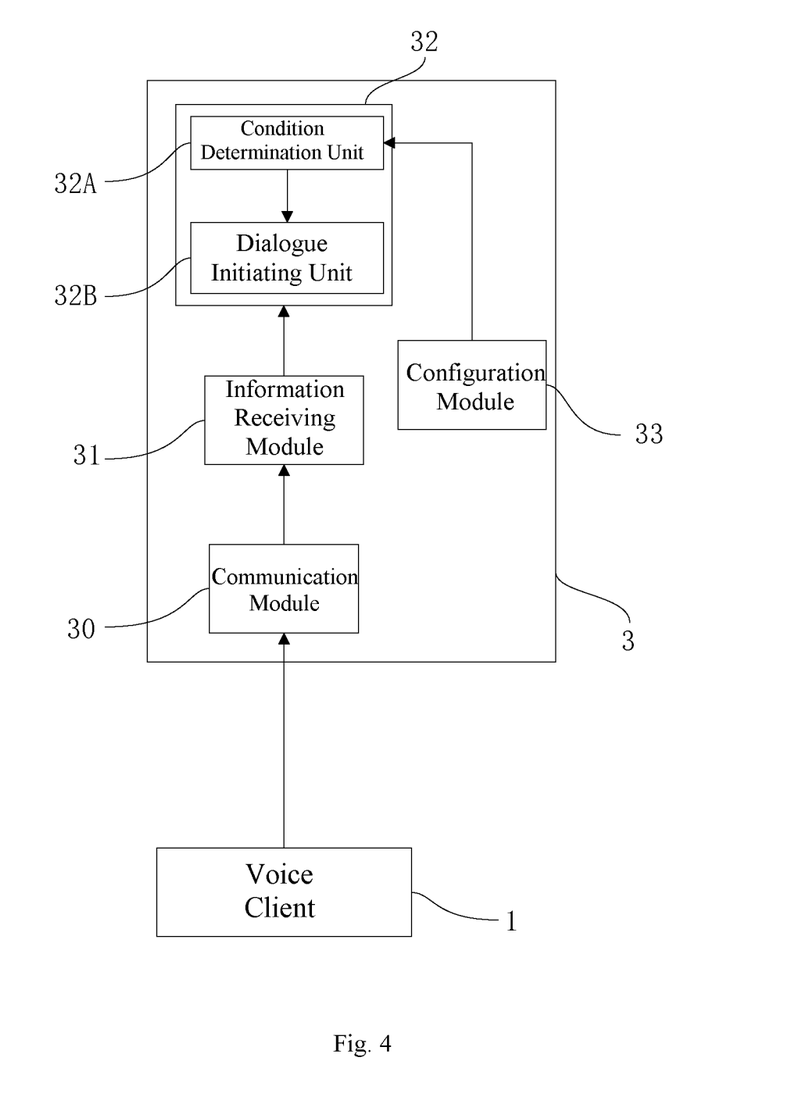
FIG. 4 is a schematic diagram of a framework structure of a voice interaction system capable of actively initiating a dialogue according to an embodiment of the present invention.

FIG. 4 schematically shows a voice interaction system capable of actively initiating a dialogue implemented by using the server shown in FIG. 3. As shown in FIG. 4, the system includes a voice client 1 and a voice server-side 3, wherein the voice server-side is a server shown in FIG. 3 for implementing an active initiation of dialogue.

As a preferred implementation example, the information stream includes audio information picked up by the voice client, and the trigger conditions may include the following two trigger conditions for active dialogue scenarios.

The first trigger condition is that the audio information contains recognition content and the recognition content is invalid as to semantics.

The second trigger condition is that the audio information does not contain recognition content and has a corresponding context status, wherein the corresponding context status includes waiting for inquiry and breaking silence.

In an implementation process, the voice client 1 initiates a connection request with the voice server-side 3, and the communication module 30 of the voice server-side 3 receives the request and establishes a communication connection with the voice client 1. After the communication connection is established, the voice client 1 transmits the collected audio information (for example, audio recorded by a radio) to the voice server-side 3 through the established communication connection in real time (which may be at a fixed frequency). The information receiving module 31 of the voice server-side 3 receives the information stream and outputs the audio information to the dialogue decision-making module 32. The dialogue decision-making module 32 determines whether to initiate an active dialogue according to the audio information and the trigger conditions configured by the configuration module 33, and obtains a matching dialogue content and outputs it to the voice client 1 when determining that an active dialogue needs to be initiated. The voice client 1 plays the dialogue content sent by the voice server-side 3 when it is received, so as to initiate the dialogue actively.

Figure 6:
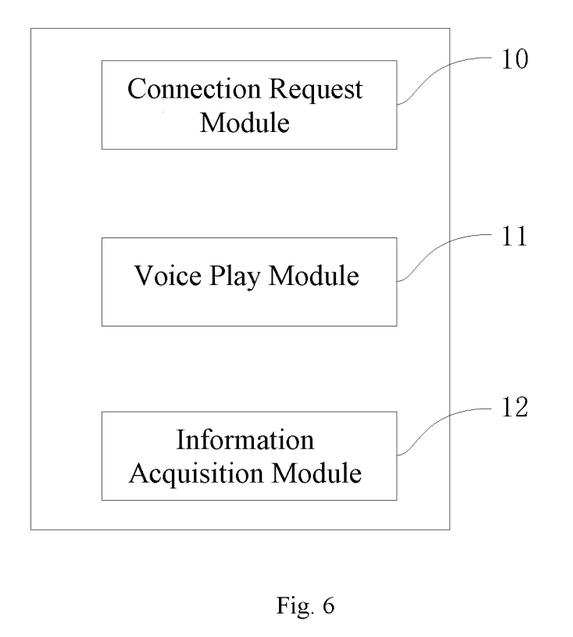
FIG. 6 is a schematic diagram of a framework structure of a voice client according to an embodiment of the present invention.

FIG. 6 schematically shows a voice client of one embodiment. As shown in FIG. 6, the voice client may include a connection request module 10 for initiating a connection request to the server-side to establish a communication connection, a voice play module 11 for playing the dialogue content received through the communication connection, and an information acquisition module 12 for acquiring the information stream and transmitting it to the server-side through the established communication connection. Exemplarily, the connection request module 10 may perform a connection request based on the WebSocket protocol or the TCP Socket custom protocol, so as to establish a duplex communication long connection with the server-side. The voice play module 11 may be implemented as a horn, a speaker, or the like. The information acquisition module 12 may include a recording device for picking up audio information, a positioning module for acquiring real-time geographic location information, and the like.

For the specific implementation process of each module and unit involved in the server, the voice server-side 3 and the voice client, reference may be made to the description in the foregoing method section, and details thereof are not repeated here.

In an embodiment, the above voice interaction system is constructed by connecting the voice client to the above server or voice server-side through the above method, which can realize the processing based on the server-side to initiate the active dialogue, and give the initiative to initiate the dialogue to the server. Through the above solution, not only can the portability of the voice client be ensured, but also the server obtains real-time and continuous voice client status, while the system has better scalability and maintainability, and voice client is facilitated to extend service functions as required. The solution of the embodiments of the present invention can also use other voice interaction functions of the server-side to grasp the overall situation, realize intelligent decision-making based on recognition, semantics and interaction scenarios, broaden the application scenarios of active dialogue, greatly improve the experience of voice interaction, and ensure intelligent interaction effect.

In some embodiments, an embodiment of the present invention provides a non-volatile computer-readable storage medium storing one or more programs including execution instructions therein, which can be read and executed by an electronic device (including but not limited to a computer, a server, or a network equipment, etc.) to perform the above-mentioned server-side processing method for implementing an active initiation of a dialog of the present invention.

In some embodiments, an embodiment of the present invention further provides a computer program product including a computer program stored on a non-volatile computer-readable storage medium, which includes program instructions enabling a computer to perform the above-mentioned server-side processing method for implementing an active initiation upon being executed by the computer.

In some embodiments, an embodiment of the present invention further provides an electronic device, comprising at least one processor and a memory communicatively connected to the at least one processor. The memory stores instructions executable by the at least one processor, so that the at least one processor can execute the instructions to implement the above-mentioned server-side processing method for implementing active initiation of a dialogue.

In some embodiments, an embodiment of the present invention further provides a storage medium on which a computer program is stored, and when the program is executed by a processor, the above-mentioned server-side processing method for implementing active initiation of a dialogue can be performed.

The server for implementing the active initiation of a dialogue according to the above embodiments of the present invention may be used to perform the server-side processing method for implementing active initiation of a dialogue according to the embodiment of the present invention, and correspondingly achieve the technical effect achieved by the above-mentioned server-side processing method for implementing the active initiation a dialogue according to the embodiments of the present invention. In the embodiments of the present invention, relevant functional modules may be implemented by a hardware processor.

Figure 5:
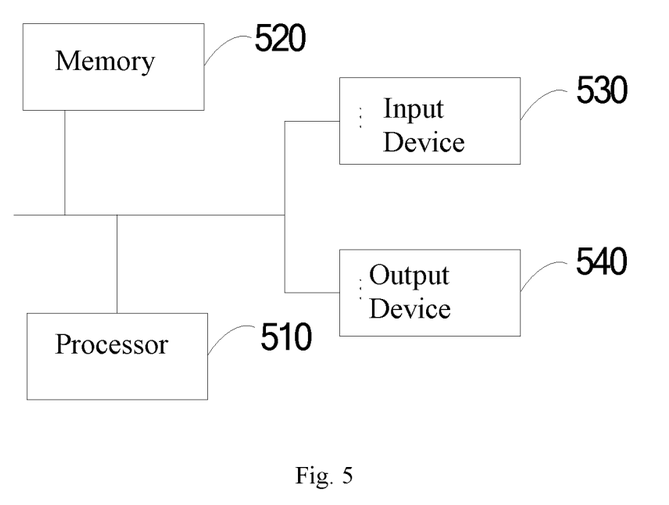
FIG. 5 is a schematic structural diagram of an electronic device according to an embodiment of the present invention.

FIG. 5 is a schematic diagram of a hardware structure of an electronic device for implementing a server-side processing method for actively initiating a dialogue provided by another embodiment of the present application. As shown in FIG. 5, the device includes:

one or more processors 510 and a memory 520, wherein one processor 510 is shown as an example in FIG. 5.

The device for performing the server-side processing method for implementing the active initiation of a dialogue may further include: an input device 530 and an output device 540.

The processor 510, the memory 520, the input device 530, and the output device 540 may be connected by a bus or in other manners, and the connection by a bus is shown as an example in FIG. 5.

As a non-volatile computer-readable storage medium, the memory 520 can be used to store non-volatile software programs, non-volatile computer-executable programs, and modules, such as program instructions/modules corresponding to the server-side processing method for implementing the active initiation of a dialogue in the embodiment of the present application. The processor 510 executes various functional applications and data processing of the server by running the non-volatile software programs, instructions and modules stored in the memory 520, i.e., implementing the server-side processing method for implementing the active initiation of a dialogue of the above method embodiment.

The memory 520 may include a program storing area and a data storing area. The program storing area may store an operating system, an application program required for at least one function. The data storing area may store data created according to the use of the server for implementing the active initiation of a dialogue, etc. Additionally, the memory 520 may include high-speed random access memory, and may also include non-volatile memory, such as at least one magnetic disk storage device, flash memory device, or other non-volatile solid-state storage device. In some embodiments, the memory 520 may optionally include memories located remotely from the processor 510, and these remote memories may be connected to the server for implementing the active initiation of a dialogue via a network. Examples of such network include, but are not limited to, the Internet, an intranet, a local area network, a mobile communication network, and combinations thereof.

The input device 530 may receive input numerical or character information, and generate signals related to user settings and function control of the server for implementing the active initiation of a dialogue. The output device 540 may include a display device such as a display screen.

The above-mentioned one or more modules are stored in the memory 520, and when executed by the one or more processors 510, the server-side processing method for implementing the active initiation of a dialogue in any of the above method embodiments is performed.

The above product can execute the method provided by the embodiments of the present application, and has functional modules and beneficial effects corresponding to the execution of the method. For technical details not described in detail in the present embodiments, reference may be made to the methods provided in the embodiments of the present application.

The electronic device in the embodiments of the present application exists in various forms, including but not limited to:

(1) Mobile communication device which features in its mobile communication function and the main goal thereof is to provide voice and data communication, such as smart phones (such as iPhone), multimedia phones, functional phones, and low-end phones;

(2) Ultra-mobile personal computer device which belongs to the category of personal computers and has computing and processing functions and generally mobile Internet access capability, such as PDA, MID and UMPC devices, e.g., iPad;

(3) Portable entertainment devices which can display and play multimedia content, such as audio and video players (such as iPod), handheld game consoles, e-books, and smart toys and portable car navigation devices;

(4) Server providing computing services and including a processor, hard disk, memory, system bus, etc., with a similar architecture to a general-purpose computer but a higher processing power and stability, reliability, security, scalability, manageability and for providing highly reliable services; and (5) Other electronic devices with data interaction function.

The device embodiments described above are only exemplary. The units described as separate components may or may not be physically separated, and the components displayed as units may or may not be physical units, that is, may be located in one place, or it can be distributed to multiple network elements. Some or all of the modules may be selected according to actual needs to achieve the object of the solution of this embodiment.

Through the description of the above embodiments, those skilled in the art can clearly understand that each embodiment can be implemented by means of software plus a common hardware platform, and of course, it can also be implemented by hardware. Based on this understanding, the above technical solutions can essentially be embodied in the form of software products that contribute to related technologies, and the computer software products can be stored in computer-readable storage media, such as ROM/RAM, magnetic disks, CD-ROM, etc., including several instructions to enable a computer device (which may be a personal computer, server, or network device, etc.) to perform the method described in each embodiment or some parts of the embodiment.

Finally, it should be noted that the above embodiments are only used to illustrate the technical solutions of the present application, rather than limitation. Although the present application has been described in detail with reference to the foregoing embodiments, those skilled in the art should understand that the technical solutions described in the foregoing embodiments can be modified, or some of the technical features can be equivalently replaced without deviating from the spirit and scope of the technical solutions of the embodiments of the present application.

The invention claimed is:

1. A server-side processing method for actively initiating a dialogue, comprising:
   establishing a communication connection with a voice client, in response to a received request for connecting from the voice client;
   receiving an information stream sent by the voice client through the communication connection;
   performing a dialogue decision-making process according to the information stream, obtaining and outputting an adapted dialogue content to the voice client upon determining that it is an active dialogue scenario,
   wherein the performing a dialogue decision-making process according to the information stream, obtaining and outputting an adapted dialogue content to the voice client upon determining that it is an active dialogue scenario comprises
   configuring a trigger condition of an active dialogue scenario and storage of dialogue content associated with the trigger condition;
   determining whether it is an active dialogue scenario according to the information stream and the configured trigger condition of the active dialogue scenario, obtaining and outputting dialogue content stored in association with a current trigger condition to the voice client when the active dialogue scenario is determined,
   wherein the information stream comprises audio information picked up by the voice client, the triggering condition comprises that recognition content is contained and the recognition content is invalid semantics, and the determining whether it is an active dialogue scenario according to the information stream and the configured trigger condition of the active dialogue scenario comprises
   recognizing the audio information to obtain a recognition result;
   determining whether the recognition result contains a recognition content, performing semantic parsing on the recognition content when the recognition content is contained, and when the semantic parsing result is invalid semantics, an active dialogue scenario is determined.

2. The server-side processing method according to claim 1, wherein the triggering condition further comprises that recognition content is not contained while a corresponding context status exists, and the determining whether it is an active dialogue scenario according to the information stream and the configured trigger condition of the active dialogue scenario further comprises
   determining whether the recognition result contains the recognition content, acquiring a context status of a voice interaction scenario for determination when the recognition content is not contained, and determining that the active dialogue scenario exists when the acquired context status of the voice interaction scenario is a corresponding context status in the trigger condition.

3. The server-side processing method according to claim 2, wherein the corresponding context status in the trigger condition comprises waiting for inquiry and breaking silence.

4. The server-side processing method according to claim 1, wherein the communication connection is a long connection of duplex communication.

5. An electronic device, comprising at least one processor and a memory communicatively connected to the at least one processor, wherein the memory stores instructions executable by the at least one processor, which are executed by the at least one processor to enable the at least one processor to perform steps of the method of claim 1.

6. A non-transitory computer-readable_storage medium storing a computer program, wherein the program implements steps of the method of claim 1 when executed by a processor.

7. A server for implementing an active initiation of a dialogue, which is configured with
   a communication module for establishing a communication connection with a voice client, in response to a received request for connecting from the voice client;
   an information receiving module for receiving an information stream sent by the voice client through the communication connection;
   a dialogue decision-making module for performing a dialogue decision-making process according to the information stream, obtaining and outputting an adapted dialogue content to the voice client when an active dialogue scenario is determined; and
   a configuration module for configuring a trigger condition of an active dialogue scenario and storing dialogue content associated with the trigger condition;
   the dialogue decision-making module comprises
   a condition determination unit for determining whether it is an active dialogue scenario according to the information stream and the configured trigger condition of the active dialogue scenario, and calling a dialogue initiation unit when the active dialogue scenario is determined; and
   the dialogue initiating unit for acquiring and outputting dialogue content stored in association with a current trigger condition to the voice client,
   wherein the information stream comprises audio information picked up by the voice client, and the trigger condition comprises that the audio information contains recognition content and the recognition content is invalid semantics, and the audio information does not contain recognition content and has corresponding context status comprising waiting for inquiry and breaking silence.

8. A voice interaction system capable of actively initiating a dialogue, which comprises a voice client and a voice server-side, wherein,
   the voice client is configured to initiate a connection request with the voice server-side, output collected audio information to the voice server-side in real time through the established communication connection after the communication connection is established, and play dialogue content sent by the voice server-side upon receiving the same; and
   the voice server-side is the server for implementing the active initiation of the dialogue according to claim 7.

* * * * *